United States Patent
Bai et al.

(10) Patent No.: US 12,528,980 B2
(45) Date of Patent: Jan. 20, 2026

(54) METHOD FOR REDUCING COEFFICIENT OF FRICTION OF A LAMINATE COMPRISING A POLYURETHANE ADHESIVE

(71) Applicant: ARKEMA FRANCE, Puteaux (FR)

(72) Inventors: ChenYan Bai, Shanghai (CN); Thorsten Schmidt, Richterswil (CH)

(73) Assignee: ARKEMA FRANCE, Puteaux (FR)

( * ) Notice: Subject to any disclaimer, the term of this patent is extended or adjusted under 35 U.S.C. 154(b) by 990 days.

(21) Appl. No.: 17/595,856

(22) PCT Filed: Jun. 3, 2019

(86) PCT No.: PCT/CN2019/089784
§ 371 (c)(1),
(2) Date: Nov. 29, 2021

(87) PCT Pub. No.: WO2020/243873
PCT Pub. Date: Dec. 10, 2020

(65) Prior Publication Data
US 2022/0235250 A1  Jul. 28, 2022

(51) Int. Cl.
| | |
|---|---|
| C09J 175/08 | (2006.01) |
| B32B 7/12 | (2006.01) |
| B32B 27/32 | (2006.01) |
| B32B 27/36 | (2006.01) |
| C09J 175/06 | (2006.01) |

(52) U.S. Cl.
CPC .............. *C09J 175/08* (2013.01); *B32B 7/12* (2013.01); *B32B 27/32* (2013.01); *B32B 27/36* (2013.01); *C09J 175/06* (2013.01); *B32B 2255/10* (2013.01); *B32B 2255/26* (2013.01); *B32B 2439/00* (2013.01)

(58) Field of Classification Search
CPC ...... C09J 175/08; C09J 175/06; C09J 175/04; B32B 7/12; B32B 27/32; B32B 27/36; B32B 2255/10; B32B 2255/26; B32B 2439/00; C08G 18/10; C08G 18/12; C08G 18/4018; C08G 18/42; C08G 18/4808; C08G 18/4825; C08G 18/4833; C08G 18/725; C08G 18/7671; C08G 18/797
USPC ...................................................... 428/423.7
See application file for complete search history.

(56) References Cited

U.S. PATENT DOCUMENTS

| | | | |
|---|---|---|---|
| 6,020,071 A | 2/2000 | Watson | |
| 6,299,980 B1 | 10/2001 | Shah et al. | |
| 8,574,478 B2 | 11/2013 | Tattum et al. | |
| 11,965,067 B2* | 4/2024 | Barretto | C08G 18/4829 |
| 2001/0031348 A1* | 10/2001 | Jud | B32B 27/32 |
| | | | 428/35.8 |
| 2006/0052523 A1* | 3/2006 | Bushendorf | B32B 7/12 |
| | | | 524/589 |
| 2011/0177987 A1 | 7/2011 | Lenting et al. | |
| 2012/0021227 A1* | 1/2012 | Kollbach | B32B 27/308 |
| | | | 156/332 |
| 2017/0247588 A1 | 8/2017 | Bai | |

FOREIGN PATENT DOCUMENTS

| | | |
|---|---|---|
| EP | 3186330 B1 | 11/2019 |
| WO | 2012078331 A1 | 6/2012 |
| WO | 2012091927 A1 | 7/2012 |
| WO | 2015017244 A1 | 2/2015 |
| WO | 2016029336 A1 | 3/2016 |
| WO | WO-2018049672 A1 * | 3/2018 ............. C08G 18/12 |

OTHER PUBLICATIONS

PCT/CN2019/089784, International Search Report and Written Opinion with a mailing date of Mar. 3, 2020.
PCT/CN2019/089784, International Preliminary Report on Patentability with a mailing date of Dec. 16, 2021.

* cited by examiner

*Primary Examiner* — Callie E Shosho
*Assistant Examiner* — Steven A Rice
(74) *Attorney, Agent, or Firm* — Gemini Law LLP

(57) ABSTRACT

A method for reducing coefficient of friction of a laminate comprising a polyurethane adhesive is provided. The method comprises providing the polyurethane adhesive; and adhering at least two substrates with the polyurethane adhesive to form a laminate, wherein the polyurethane adhesive is formed by reacting (A) an isocyanate component comprising a prepolymer derived from the reaction of a diisocyanate, a polyethylene glycol and optionally an additional polyol; with (B) a polyol component. The method can achieve minimized COF and viscosity, while retaining other performance properties such as bond strength, heat seal strength and boil in bag resistance. A composition for preparing the adhesive, a laminate product prepared with said composition as well the method for preparing the laminate product are also provided.

5 Claims, No Drawings

METHOD FOR REDUCING COEFFICIENT OF FRICTION OF A LAMINATE COMPRISING A POLYURETHANE ADHESIVE

FIELD OF THE INVENTION

The present disclosure relates to a method for reducing coefficient of friction of a laminate comprising a polyurethane adhesive, a solventless adhesive composition and a method for preparing the same, a laminate product comprising an adhesive layer derived from the solventless adhesive composition and a method for preparing the same. The adhesive layer prepared with said solventless adhesive composition can achieve minimized coefficient of friction (COF) and viscosity, while retaining other performance properties such as bond strength, heat seal strength and boil in bag resistance.

BACKGROUND

Adhesive compositions are useful for a wide variety of applications. For instance, they can be used to bond substrates such as polyethylenes, polypropylenes, polyesters, polyamides, metals, papers, or cellophanes to form composite films, i.e., laminates. The use of adhesives in different laminating end-use applications is generally known. For example, adhesives can be used in the manufacture of film/film and film/foil laminates commercially used in the packaging industry, especially for food packaging. The adhesives used in laminating applications are known as "laminating adhesives" and can be generally classified into three categories: solvent-based, water-based, and solventless. The performance of an adhesive may vary based on the category of the adhesive and the application in which the adhesive is applied.

Solventless laminating adhesives may comprise up to 100% solids, i.e. without either organic solvents or aqueous carriers. As no organic solvent or water has to be removed from the adhesive upon application, these adhesives can be applied with high line speeds and are preferable in applications requiring quick adhesive application. Solvent-based and water-borne laminating adhesives are limited by the rate at which the solvent or water carrier can be effectively dried and removed upon application. For environmental, health, and safety reasons, laminating adhesives are preferably aqueous or solventless. Various kinds of solventless laminating adhesives have been reported, and a great deal of research has been made on the two-component polyurethane-based laminating adhesives. Typically, a two-component polyurethane-based laminating adhesive includes a first component comprising an isocyanate-containing prepolymer and a second component comprising one or more polyols. The first component is obtained by the reaction of an isocyanate monomer with an isocyanate-reactive compound such as a polyether polyol and/or a polyester polyol. The second component is an isocyanate-reactive compound such as a polyether polyol and/or a polyester polyol. Each component can optionally include one or more additional additives. The two components are combined in a predetermined ratio and applied on a film/foil substrate, which is then laminated to another film/foil substrate.

Nevertheless, the above stated two-component solventless polyurethane-based laminating adhesives exhibit several disadvantages. For example, Coefficient of Friction (COF) is one of the most important properties for different laminates such as PET/PE laminates. Nevertheless, a significant increase of COF occurred in many PU solventless adhesive systems developed in the past. For example, the PU solventless adhesive prepared by using propylene glycol exhibited a rather high COF which might limit its commercialization. Much research has been made but none of these was able to solve this problem.

For the above reasons, two-component solventless polyurethane-based laminating adhesive compositions with inhibited COF, while the other performance properties, such as minimized viscosity, good bond strength, high heat seal strength and superior boil in bag resistance being retained, are desirable.

After persistent exploration, we have surprisingly found a solventless polyurethane adhesive composition which can achieve one or more of the above targets.

SUMMARY OF THE INVENTION

The present disclosure provides a unique method for reducing coefficient of friction of a laminate comprising a polyurethane adhesive, a solventless polyurethane adhesive composition and a laminate product prepared by using the same.

In a first aspect of the present disclosure, the present disclosure provides a method for reducing coefficient of friction of a laminate comprising a polyurethane adhesive, comprising the steps of
  providing the polyurethane adhesive; and
  adhering at least two substrate with the polyurethane adhesive;
  wherein the polyurethane adhesive is formed by reacting
  (A) an isocyanate component comprising a prepolymer which is derived from the reaction of (i) one or more diisocyanates, (ii) one or more polyethylene glycols having a molecular weight from 200 to 2,000 g/mol, and optionally (iii) an additional polyol selected from a polyether polyol other than the polyethylene glycol, a polyester polyol and combination thereof, with the proviso that the prepolymer comprises at least two free isocyanate groups; with
  (B) a polyol component comprising at least one polyether polyol, at least one polyester polyol, or a combination thereof.

In a second aspect of the present disclosure, the present disclosure provides a solventless adhesive composition, comprising:
  (A) an isocyanate component comprising a prepolymer which is derived from the reaction of (i) one or more diisocyanates, (ii) one or more polyethylene glycols having a molecular weight from 200 to 2,000 g/mol, and optionally (iii) an additional polyol selected from a polyether polyol other than the polyethylene glycol, a polyester polyol and combination thereof, with the proviso that the prepolymer comprises at least two free isocyanate groups; wherein the diisocyanates can be aliphatic diisocyanate, cycloaliphatic diisocyanate, aromatic diisocyanate, heteroaromatic diisocyanate, or any combinations thereof, and is more preferably one or more aromatic diisocyanate; and
  (B) a polyol component comprising at least one polyether polyol, at least one polyester polyol, or a combination thereof.

In a third aspect of the present disclosure, the present disclosure provides a laminate product comprising at least two substrates and an adhesive layer sandwiched therebetween, wherein the adhesive layer is formed by the reaction between the (A) isocyanate component and the (B) isocyanate-reactive component of the solventless adhesive composition of the present disclosure.

In a fourth aspect of the present disclosure, the present disclosure provides a process for preparing the laminate product, comprising the steps of providing the two substrates; providing the solventless adhesive composition of the present disclosure; combining the isocyanate component (A) with the polyol component (B) to form a curable mixture; adhering the two substrates together with the curable mixture; and optionally, curing the curable mixture or allowing the curable mixture to cure.

In a fifth aspect of the present disclosure, the present disclosure provides the use of a polyethylene glycol for reducing coefficient of friction of a laminate comprising a polyurethane adhesive and a substrate, wherein the polyurethane adhesive is formed by reacting (A) an isocyanate component comprising a prepolymer with (B) a polyol component comprising at least one polyether polyol, at least one polyester polyol, or a combination thereof, the prepolymer is prepared by reacting one or more diisocyanates with said polyethylene glycol and optionally (iii) an additional polyol selected from a polyether polyol other than the polyethylene glycol, a polyester polyol and combination thereof, with the proviso that the prepolymer comprises at least two free isocyanate groups, and the polyethylene glycols has a molecular weight from 200 to 2,000 g/mol.

It is to be understood that both the foregoing general description and the following detailed description are exemplary and explanatory only and are not restrictive of the invention, as claimed.

DETAILED DESCRIPTION OF THE INVENTION

Unless defined otherwise, all technical and scientific terms used herein have the same meaning as commonly understood by one of ordinary skill in the art to which the invention belongs. Also, all publications, patent applications, patents, and other references mentioned herein are incorporated by reference.

As disclosed herein, "and/or" means "and, or as an alternative". All ranges include endpoints unless otherwise indicated.

According to an embodiment of the present disclosure, the solventless adhesive composition is a "two-part" or "two-package" composition comprising an isocyanate component (A) of urethane prepolymer and an isocyanate-reactive component (B). The prepolymer in said component (A) comprises a segment derived from a polyethylene glycol which effectively decreases the COF of the solventless adhesive derived therefrom, while retaining the other performance properties basically unchanged. According to a preferable embodiment, the isocyanate component (A) and the isocyanate-reactive component (B) are transported and stored separately, combined shortly or immediately before being applied during the manufacture of the laminate product.

The prepolymer contained in the isocyanate component (A) is a urethane prepolymer formed by the reaction of (i) one or more diisocyanates, (ii) one or more polyethylene glycols having a molecular weight from 200 to 2,000 g/mol, and optionally (iii) an additional polyol selected from a polyether polyol other than the polyethylene glycol, a polyester polyol and combination thereof, with the proviso that the prepolymer comprises at least two free isocyanate groups.

In various embodiments, organic solvent is preferably not used in the preparation of the polyurethane prepolymer. According to a preferable embodiment of the present disclosure, neither organic solvent nor aqueous solvent is intentionally used in the preparation of the polyurethane prepolymer. As disclosed herein, the terms "solvent free", "solventless" or "non-solvent", can be used interchangeably for describing the adhesive composition, the urethane prepolymer, etc., and shall be interpreted that the mixture of all the raw materials used for preparing the adhesive composition, the urethane prepolymer comprise less than 3% by weight, preferably less than 2% by weight, preferably less than 1% by weight, more preferably less than 0.5% by weight, more preferably less than 0.2% by weight, more preferably less than 0.1% by weight, more preferably less than 100 ppm by weight, more preferably less than 50 ppm by weight, more preferably less than 10 ppm by weight, more preferably less than 1 ppm by weight of any organic or inorganic solvents, based on the total weight of the mixture of raw materials. As disclosed herein, the term "solvent" refers to organic and inorganic liquids whose function is solely dissolving one or more solid, liquid or gaseous materials without incurring any chemical reaction. In other words, although some organic compounds, e.g. ethylene glycol, propylene glycol, and other polyols, which are generally considered as "solvent" in the polymerization technology, might be used in the preparation of the adhesive composition or the urethane prepolymer, none of them belongs to "solvent" since they mainly function as isocyanate-reactive functional substance, adhesion promoter, chain extending agent, etc. by incurring chemical reactions.

According to various embodiments of the present disclosure, the diisocyanates can be aliphatic diisocyanate, cycloaliphatic diisocyanate, aromatic diisocyanate, heteroaromatic diisocyanate, or any combinations thereof. According to a preferable embodiment of the present disclosure, the diisocyanate is an aromatic diisocyanate. Preferably, the aromatic diisocyanates is a monomeric compound and preferably has a molecular weight Mw of less than 300 g/mol, and more preferably of less than 275 g/mol. According to an embodiment of the present disclosure, the aromatic diisocyanate contains one or more aromatic rings. The monomeric aromatic diisocyanates are selected from the group consisting of phenylene diisocyanate, methylene diphenyl diisocyanate (MDI), toluene diisocyanate (TDI), carbodiimide modified MDI, naphthylene diisocyanate and the combination thereof. TDI can be generally used with any commonly available isomer distribution. The most commonly available TDI has an isomer distribution of 80% of the 2,4-isomer and 20% of the 2,6-isomer. TDI with other isomer distributions can also be used. When MDI is used, it is preferably pure 4,4'-MDI or any combinations of MDI isomers. More preferably, it is pure 4,4'-MDI, and any combinations of 4,4'-MDI with other MDI isomers. When the combinations of 4,4'-MDI with other MDI isomers are used, the preferred concentration of 4,4'-MDI is from 25% to 75% of all the MDI isomers. According to an alternative embodiment of the present disclosure, examples of aromatic diisocyanate include, but are not limited to, isomers of methylene diphenyl dipolyisocyanate ("MDI") such as 4,4-MDI, 2,4-MDI and 2,2'-MDI, or modified MDI such as carbodiimide modified MDI or allophanate modified MDI; isomers of toluene-dipolyisocyanate ("TDI") such as 2,4-TDI, 2,6-TDI, isomers of naphthalene-dipolyisocyanate ("NDI") such as 1,5-NDI, and combinations thereof.

The diisocyanate compounds (preferably, aromatic diisocyanate compounds) and the urethane prepolymer may be characterized by the parameter "% NCO" which is the amount of isocyanate groups by weight based on the weight of the compound. The parameter % NCO can be measured by the method of ASTM D 2572-97 (2010). According to an embodiment of the present disclosure, the disclosed isocyanate component has a % NCO of at least 3 wt %, or at least 5 wt %, or at least 7 wt %. In some embodiments, the isocyanate component has a NCO not to exceed 30 wt %, or 25 wt %, or 22 wt %, or 20 wt %.

According to an embodiment of the present disclosure, the diisocyanate compounds (preferably, aromatic diisocyanate compounds) are used at a stoichiometrically excessive amount with relative to the polyethylene glycol and the additional polyols, when present, during the preparation of the prepolymer so that the resultant polymer comprises free isocyanate groups for the further reaction with the isocyanate-reactive component (B). According to an embodiment of the present disclosure, the content of the diisocyanate is from 30 wt % to 65 wt %, with the combined weight of the diisocyanate, the polyethylene glycol and the additional polyols being taken as 100 wt %. According to a preferable embodiment of the present disclosure, the content of the diisocyanate (preferably, aromatic diisocyanate) can be in the numerical range obtained by combining any two of the following end point values: 27 wt %, 30 wt %, 33 wt %, 35 wt %, 40 wt %, 45 wt %, 50 wt %, 55 wt %, 60 wt %, 65 wt % and 70 wt %.

The polyethylene glycol and the additional polyols, if any, react with the above stated diisocyanate compound to produce the urethane prepolymer. Without being limited by any specific theory, it is believed that the introduction of the moiety derived from the polyethylene glycol in the urethane prepolymer is able to achieve a significant decrease in the COF of the resultant adhesive over those derived from e.g. polypropylene glycol, while retaining other performance properties such as low viscosity, high bond strength, heat seal strength and boil in bag resistance. According to an embodiment of the present disclosure, the polyethylene glycol has a hydroxyl functionality of 1.8 to 4, preferably from 1.9 to 3.5, more preferably from 2 to 3. According to another embodiment of the present disclosure, the polyethylene glycol has a molecular weight from 200 to 2,000 g/mol, preferably from 400 to 2,000 g/mol, more preferably from 400 to 1,000 g/mol. According to an embodiment of the present disclosure, the content of the polyethylene glycol is from 5 wt % to 70 wt %, with the combined weight of the diisocyanate, the polyethylene glycol and the additional polyols being taken as 100 wt %. According to a preferable embodiment of the present disclosure, the content of the polyethylene glycol can be in the numerical range obtained by combining any two of the following end point values: 4 wt %, 6 wt %, 8 wt %, 10 wt %, 12 wt %, 14 wt %, 16 wt %, 18 wt %, 20 wt %, 22 wt %, 24 wt %, 26 wt %, 28 wt %, 30 wt %, 32 wt %, 33 wt %, 35 wt %, 40 wt %, 45 wt %, 50 wt %, 55 wt %, 60 wt %, 65 wt % and 70 wt %.

It's noted that the polyethylene glycol can be directly mixed with the diisocyanate compound and the additional polyols to form the prepolymer. Alternatively, the polyethylene glycol may be combined with the additional polyols and then react with the aromatic diisocyanate to form the prepolymer.

The additional polyol is an optional component as it can be either absent or present during the preparation of the urethane prepolymer. According to an embodiment of the present disclosure, no additional polyol is adopted and the urethane prepolymer is prepared by using the polyethylene glycol as the only isocyanate-reactive component, besides other optional process additive such as crosslinking agent or adhesion promoter having at least one isocyanate-reactive groups (hydroxyl group, amino group, thiol group, etc.). Under such a circumstance, the amount of the additional polyol is zero.

According to an alternative embodiment of the present disclosure, one or more additional polyols are used in combination with the polyethylene glycol for preparing the urethane prepolymer. In various embodiments of the present disclosure, the additional polyols comprises one or more polyols selected from the group consisting of polyester polyols, polyether polyols other than polyethylene glycol, and a combination thereof. Preferably, the additional polyol is selected from the group consisting of polyester polyols having a molecular weight from 200 to 5,000 g/mol, polyether polyols (other than the polyethylene glycol) having a molecular weight from 200 to 5,000 g/mol, and combinations thereof.

In a preferable embodiment, the additional polyol is a polyester polyol having a molecular weight from 200 to 5,000 g/mol, preferably from 400 to 2,000 g/mol. The polyester polyol is typically obtained by reacting polyfunctional alcohols having from 2 to 12 carbon atoms, preferably from 2 to 10 carbon atoms, with polyfunctional carboxylic acids having from 2 to 12 carbon atoms, preferably 2 to 10 carbon atoms, or anhydrides/esters thereof. Typical polyfunctional alcohols for preparing the polyester polyol are preferably diols or triols and include ethylene glycol, butylene glycol, diethylene glycol, triethylene glycol, polyalkylene glycols, 1,2-propanediol, 1,3-propanediol, 1,3-butanediol, 1,4-butanediol, 1,6-hexanediol, neopentyl glycol, triols, tetraols, and any combinations thereof. Typical polyfunctional carboxylic acids can be aliphatic, cycloaliphatic, araliphatic, aromatic or heterocyclic and may be substituted, for example with halogen atoms, and/or may be saturated or unsaturated. Preferably, the polyfunctional carboxylic acids are selected from the group consisting of adipic acid, suberic acid, azelaic acid, sebacic acid, phthalic acid, isophthalic acid, phthalic anhydride, and any combinations thereof. Preference is given to dicarboxylic acids represented the general formula HOOC—$(CH_2)_y$—COOH, where y is an integer from 1 to 10, preferably an even number from 2 to 10. The polyester polyol is preferably terminated with at least two hydroxyl groups. In a preferable embodiment, the polyester polyol has a hydroxyl functionality of 1.8 to 3, preferably from 2 to 3. In another embodiment, the polyester polyol has a OH number of 30 to 200 mg KOH/g, preferably from 40 to 180 mg KOH/g, and more preferably from 50 to 160 mg KOH/g.

Alternatively, the polyester polyol includes lactone-based polyester diols, which are homopolymers or copolymers of lactones, preferably terminal hydroxyl-functional addition products of lactones with suitable difunctional initiator molecules. Preferred lactones are derived from compounds represented by the general formula HO—$(CH_2)_z$—COOH, where z is an integer from 1 to 20 and one hydrogen atom of a methylene unit may also be replaced by a $C_1$ to $C_4$ alkyl radical. Exemplary lactone-based polyesterdiols include ε-caprolactone, β-propiolactone, γ-butyrolactone, methyl-ε-caprolactone or mixtures thereof.

In another preferable embodiment, the additional polyol is a polyether polyol (other than polyethylene glycol) having a functionality (average number of hydroxyl group in a polyol molecule) of 1.8 to 3.0 and a weight average molecular weight (Mw) of 200 to 5,000 g/mol, preferably from 300 to 4,000 g/mol, more preferably from 400 to 2,000 g/mol. The polyether polyols is generally prepared by polymerization of one or more alkylene oxides selected from propylene oxide (PO), butylene oxide, tetrahydrofuran and mixtures thereof.

In general, the content of the additional polyol used in the preparation of the prepolymer may range from about 0 wt % to 40 wt %, such as from larger than 0 wt % to 40 wt %, with the combined weight of the aromatic diisocyanate, the polyethylene glycol and the additional polyol being taken as 100 wt %. According to a preferable embodiment of the present disclosure, the content of the additional polyol can be in the numerical range obtained by combining any two of the following end point values: 0 wt %, 2 wt %, 5 wt %, 8 wt %, 10 wt %, 12 wt %, 15 wt %, 18 wt %, 20 wt %, 22 wt %, 25 wt %, 28 wt %, 30 wt %, 32 wt %, 33 wt %, 35 wt %, 40 wt %.

The polyol component (B) comprises one or more polyols having at least two hydroxy groups, wherein the polyol can be either identical with or different from the polyethylene glycol, the additional polyether polyol and the polyester polyol used for preparing the urethane prepolymer.

According to a preferable embodiment of the present disclosure, the polyol component (B) is a blend of one or more polyether polyols with one or more polyester polyols, wherein the polyether polyols and the polyester polyols are independently selected from those used for the preparation of the urethane prepolymer, i.e. the polyethylene glycol, the additional polyether polyol and the polyester polyol stated above. Particularly speaking, the polyol component may comprises (1) polyether polyols selected from the group consisting of polyethylene glycol, polypropylene glycol, polybutylene glycol, polytetramethylene ether glycol, and any combinations thereof; (2) polyester polyol which a condensation product of polyols selected from the group consisting of ethylene glycol, diethylene glycol, triethylene glycol, 1,2-propanediol, 1,3-propanediol, 1,3-butanediol, 1,4-butanediol, 1,6-hexanediol, neopentyl glycol, triols, tetraols (e.g., trimethylolpropane, glycerol, pentaerythritol, etc.), and any combinations thereof; with polyfunctional acids selected from the group consisting of adipic acid, suberic acid, azelaic acid, sebacic acid, phthalic acid, isophthalic acid, phthalic anhydride, tetrahydrophthalic anhydride, hexahydrophthalic anhydride, tetrachlorophthalic acid, and any combinations thereof; or (3) any combinations thereof. According to a preferable embodiment of the present disclosure, the polyol compounds of the polyol component have a functionality (average number of hydroxyl group in a polyol molecule) of 1.8 to 4.0 and a weight average molecular weight (Mw) of 200 to 5,000 g/mol, preferably from 300 to 4,000 g/mol, more preferably from 400 to 2,000 g/mol.

According to a preferable embodiment of the present disclosure, the polyol component (B) comprises a blend of 20-40 wt % polyester polyol and 60-80 wt % polyether polyol, with the total weight of the polyol component (B) being taken as 100 wt %. Furthermore, the above stated polyether polyol can be a blend of one or more polyethylene glycols and one or more polypropylene glycols, wherein the content of the polyethylene glycol is from 0.5 wt % to 10 wt %, and the content of the polypropylene glycol is from 50 wt % to 79.5 wt %, with the total weight of the polyol component (B) being taken as 100 wt %.

According to various embodiments of the present disclosure, the weight ratio between the isocyanate component (A) and the polyol component (B) is from 100:30 to 100:100. According to a preferable embodiment, said weight ratio can be in the numerical range obtained by combining any two of the following ratios: 100:30, 100:40, 100:50, 100:60, 100:70, 100:80, 100:90, and 100:100.

As stated above, the isocyanate component (A) mainly comprises a urethane prepolymer prepared by the polymerization reaction between the diisocyanate compound (i) and the glycol/polyol compounds. The isocyanate component (A) and the polyol component (B) are transported and stored separately, combined shortly or immediately before being applied during the manufacture of the lamination. In some embodiments, both the isocyanate component and the polyol component are each liquid at ambient temperature. When it is desired to use the adhesive composition, the isocyanate component and the polyol component are brought into contact with each other and mixed together. Once mixed, polymerization (curing) reaction occurs between the free isocyanate groups in the isocyanate component (A) (and preferably the urethane prepolymer) and the hydroxyl group in the polyol component (B) to form a polyurethane which exhibit the function of adhesive in the adhesive layer between two or more substrates. The adhesive composition formed by bringing the two components into contact can be referred to as a "curable mixture".

One or more catalysts may be optionally used to promote or accelerate the above stated polymerization reaction for preparing the urethane prepolymer in the isocyanate component (A) and/or the polymerization between the urethane prepolymer of (A) and the polyol component (B).

The catalyst may include any substance that can promote the reaction between the isocyanate group and the hydroxy group. Without being limited to theory, the catalysts can include, for example, glycine salts; tertiary amines; tertiary phosphines, such as trialkylphosphines and dialkylbenzylphosphines; morpholine derivatives; piperazine derivatives; chelates of various metals, such as those which can be obtained from acetylacetone, benzoylacetone, trifluoroacetyl acetone, ethyl acetoacetate and the like with metals such as Be, Mg, Zn, Cd, Pd, Ti, Zr, Sn, As, Bi, Cr, Mo, Mn, Fe, Co and Ni; acidic metal salts of strong acids such as ferric chloride and stannic chloride; salts of organic acids with variety of metals, such as alkali metals, alkaline earth metals, Al, Sn, Pb, Mn, Co, Ni and Cu; organotin compounds, such as tin(II) salts of organic carboxylic acids, e.g., tin(II) diacetate, tin(II) dioctanoate, tin(II) diethylhexanoate, and tin(II) dilaurate, and dialkyltin(IV) salts of organic carboxylic acids, e.g., dibutyltin diacetate, dibutyltin dilaurate, dibutyltin maleate and dioctyltin diacetate; bismuth salts of organic carboxylic acids, e.g., bismuth octanoate; organometallic derivatives of trivalent and pentavalent As, Sb and Bi and metal carbonyls of iron and cobalt; or mixtures thereof.

In general, the content of the catalyst used herein is larger than zero and is at most 1.0 wt %, preferably at most 0.5 wt %, more preferably at most 0.05 wt %, based on the total weight of all the reactants.

The adhesive composition of the present disclosure may optionally comprise any additional auxiliary agents and/or additives for specific purposes.

In one embodiment of the present disclosure, one or more of the auxiliary agents and/or additives may be selected from the group consisting of other co-catalysts, surfactants, toughening agents, flow modifiers, adhesion promoters, diluents, stabilizers, plasticizers, catalyst de-activators, dispersing agents and mixtures thereof.

According to a preferable embodiment, one or more adhesion promoters are further used for preparing the composition of the present disclosure. Any adhesion promoters can be used in the present disclosure, with aminosilane, epoxy silane or phosphate ester being preferable. Suitable examples of the adhesion promoters include amino silane such as aminopropyltriethoxysilane, epoxy silane such as 3-glycidoxypropyltriethoxysilane, and phosphate ester such as the reaction products of polyols with phosphoric acid or polyphosphoric acid. The adhesion promoter can be covalently bonded onto the backbone of the polyurethane prepolymer by being added during the preparation of the urethane polymer. Alternatively or additionally, the adhesion promoter can also be added into the polyurethane adhesive composition as a post additive. The selection of proper adhesion promoter is generally known in the prior art, and it is used at an amount range of from 0.1% to 3%, preferably from 0.1% to 2%, and more preferably from 0.1% to 1% by weight based on total weight of the polyurethane prepolymer.

A method of forming a laminate using said adhesive composition is also disclosed. In some embodiments, the adhesive composition indicated above, is in a liquid state. In some embodiments, the composition is a liquid at 25° C. Even if the composition is solid at 25° C., it is acceptable to heat the composition as necessary to convert it into a liquid state. A layer of the composition is applied to a surface of a substrate or a film. A "substrate/film" is any structure that is 0.5 mm or less in one dimension and is 1 cm or more in both of the other two dimensions. A polymer film is a film that is made of a polymer or mixture of polymers. The composition of a polymer film is, typically, 80 percent by weight or more by weight one or more polymers. In some embodiments, the thickness of the layer of the curable mixture applied to the film is 1 to 5 µm.

In some embodiments, a surface of another substrate/film is brought into contact with the layer of the curable mixture to form an uncured laminate. The adhesive composition may be applied by conventional solvent-less machine, e.g. Labo-Combi 400 machine from Nordmeccanica. The curable mixture is then cured or allowed to cure. The uncured laminate may be subjected to pressure, for example by passing through nip rollers, which may or may not be heated. The uncured laminate may be heated to accelerate the cure reaction. Suitable substrates/films include paper, woven and nonwoven fabric, metal foil, polymers, and metal-coated polymers. Films optionally have a surface on which an image is printed with ink; the ink may be in contact with the adhesive composition. In some embodiments, the substrates/films are polymer films or metal-coated polymer films, and more preferred are polymer films.

The process of the present disclosure may be carried out continuously or batchwise. An example of the continuous process is a roll to roll process, in which a roll of a first substrate/film is unwound and transmitted through two or more work station where the isocyanate component (A) and the polyol component (B) are mixed to form the adhesive composition (curable mixture) of the present application which is applied onto a surface of the first substrate/film. The adhesive composition (curable mixture) of the present application can be applied more than once to achieve a desirable film thickness or composition profile. A second substrate/film may be applied onto the uncured adhesive layer with or without the aid of rollers. Heating or irradiation devices may be arranged to promote the curing of the coated adhesive layer, and rollers can also be used for enhancing the adhesion strength within the laminate. The second substrate/film can be identical with or different from the first substrate/film and can also be unwound from a roll. In the end of the continuous technology, the cured laminate product is wound up on a spindle.

The laminate product disclosed herein can be cut or otherwise shaped so as to have a shape suitable for any desired purpose, such as packaging material.

EXAMPLES

Some embodiments of the invention will now be described in the following Examples, wherein all parts and percentages are by weight unless otherwise specified. However, the scope of the present disclosure is not, of course, limited to the formulations set forth in these examples. Rather, the Examples are merely inventive of the disclosure.

The information of the raw materials used in the examples is listed in the following table 1:

TABLE 1

Raw materials used in the examples

| Component | Grade name | Characterization | Vendor |
|---|---|---|---|
| Polyol | PEG1000 | Polyethylene glycol | The Dow Chemical Company |
|  | PEG400 | Polyethylene glycol | The Dow Chemical Company |
|  | PPG1000 | Polypropylene glycol | The Dow Chemical Company |
|  | Bester 1093 | Polyester polyol | The Dow Chemical Company |
|  | MF C99 | A polyol component | The Dow Chemical Company |
| Isocyanate | Isonate 125M | Methylene diphenyl diisocyanate | The Dow Chemical Company |
|  | Isonate 50 OP | Methylene diphenyl diisocyanate (MDI) | The Dow Chemical Company |
|  | Isonate 143L | Modified MDI | The Dow Chemical Company |

Isocyanate Components (urethane prepolymer) of Examples (Ex.) 1 to 7 and Comparative Examples (CEx.) 1 to 3 are synthesized according to the procedure described below using the relative contents of raw materials listed in Table 2 and 3, in percentage by weight based on total weight of the isocyanate component.

The Isocyanate Components (urethane prepolymers) are synthesized in a 1 L glass reactor according to a typical polyurethane prepolymer preparation process. In particular, the aromatic diisocyanate monomers as shown in Table 2 and Table 3 are introduced into the reactor and maintained at 60° C. with nitrogen protection. Then, the polyethylene glycol and additional polyols (particularly, polypropylene glycol and polyester polyol) shown in Table 2 and Table 3 are introduced into the reactor. The temperature is slowly increased to 80° C. and maintained for 2 to 3 hours. The produced urethane prepolymer, i.e., the isocyanate component, is charged into a sealed container with nitrogen protection for further application.

TABLE 2

Formulations for the Preparation of the Isocyanate Components
and the Characterization Results for the Adhesion Composition

| | Composition information | | | | COF performance results on PET/PE25 | | 1 d@45 C. + PET/PE60 | |
|---|---|---|---|---|---|---|---|---|
| | Isonate 50 OP | PPG1000 | PEG1000 | PEG400 | 1 d@45 C. | 1 d RT | BS | HS |
| Ex1 | 58 | 32 | 10 | | 0.373 | 0.258 | 2.3 | 50 |
| CEx1 | 58 | 42 | | | 0.424 | 0.248 | 2.2 | 51 |
| EX2 | 55 | | | 45 | 0.259 | 0.193 | 2.5 | 35 |
| EX3 | 33 | | 67 | | 0.323 | 0.116 | 3.0 | 30 |
| CEX2 | 33 | 67 | | | 0.505 | 0.309 | 3.2 | 36 |

TABLE 3

Formulations for the Preparation of the Isocyanate Components
and the Characterization Results for the Adhesion Composition

| | Composition information | | | | | | COF performance results on PET/PE25 | | 1 d@45 C. + PET/PE60 | |
|---|---|---|---|---|---|---|---|---|---|---|
| | Isonate 50 OP | Isonate 125M | Isonate 143L | Bester 1093 | PEG1000 | PEG400 | 1 d@45 C. | 1 d RT | BS | HS |
| Ex4 | | 24 | 34 | 36 | 6 | | 0.238 | 0.07 | 2.4 | 53 |
| Ex5 | | 36 | 22 | 36 | | 6 | 0.278 | 0.06 | 2.6 | 55 |
| Ex6 | 58 | | | | 24 | 18 | 0.182 | 0.148 | 2.3 | 48 |
| Ex7 | 58 | | | 21 | 21 | | 0.252 | 0.085 | 2.5 | 53 |
| CEx3 | 58 | | | 42 | | | 0.279 | 0.146 | 2.5 | 53 |

The Isocyanate Components prepared in Examples (Ex.) 1 to 7 and Comparative Examples (CEx.) 1 to 3 were mixed with MF C99 (the Polyol Component B) to form the adhesive, with the NCO/OH index being kept at a constant level (stoichiometrically equivalent amount).

Laminates were prepared with these adhesives in a Labo-Combi 400 machine from Nordmeccanica under the following processing conditions: line speed was set as 120 mpm and 150 mpm, temperature of transfer roller was 45° C., nip temperature was set as 60° C., and coating weight was set as 1.8 gsm. Different substrates were selected to form PET/PE25 and PET/PE60 as testing laminate structures, which were characterized with the following technologies.

Test Methods
Bond Strength (BS)

Laminates prepared with the adhesive compositions, a PET substrate and a PE60 substrate were cut into 15 mm width strips for T-peel test under 250 mm/min crosshead speed using a 5940 Series Single Column Table Top System available from Instron Corporation. During the test, the tail of each strip was pulled slightly by fingers to make sure the tail remained 90 degree to the peeling direction. Three strips for each sample were tested and the average value was calculated. Results were represented with the unit of N/15 mm. A higher value represents a better the bond strength.

Heat Seal Strength (HS)

Laminates prepared with the adhesive compositions, a PET substrate and a PE60 substrate were heat-sealed in a HSG-C Heat-Sealing Machine available from Brugger Company under 140° C. seal temperature and 300N pressure for 1 second, then cooled down and cut into 15 mm width strips for heat seal strength test under 250 mm/min crosshead speed using a 5940 Series Single Column Table Top System available from Instron Corporation. Three strips for each sample were tested and the average value was calculated. Results were represented with the unit of N/15 mm. A higher value represents a better heat seal strength.

COF Test

Freshly laminated films (prepared with the adhesive compositions, a PET substrate and a PE25 substrate) was cured in an oven at 45° C. for 24 hrs, then taken out and cooled down, then cut into 64 mm×64 mm and 10 cm×10 cm strips. The 64 mm×64 mm strip was stuck onto the slider and the 10 cm×10 cm strip was stuck onto the machine platform, make sure the PE side of two strips are face to face contacted to provide friction value. The COF machine was calibrated before testing. Three strips were tested for each sample and the average value was calculated.

It can be seen From Table 2 and Table 3 that the inventive examples comprising polyethylene glycol show better COF performance under different aging conditions (one day at 45° C.; or one day at 45° C. and one day at ambient temperature) over the comparative examples having no polyethylene glycol, while retaining a comparable mechanical strength (BS and HS).

What is claimed is:
1. A laminate product comprising:
a first substrate that is a polyethylene;
a second substrate that is a polyethylene terephthalate; and
an adhesive layer sandwiched between and in direct contact with each of the first substrate and the second substrate, wherein the adhesive layer is formed by the reaction between
(A) an isocyanate component consisting of a prepolymer, which is derived from the reaction of
(i) one or more diisocyanates,

(ii) from 60 wt % to 70 wt % of a polyethylene glycol having a molecular weight from 200 to 2,000 g/mol, wherein the weight percent is based on the total weight of the isocyanate component (A), and (iii) optionally an additional polyol selected from the group consisting of a polyether polyol other than the polyethylene glycol, a polyester polyol, and combinations thereof, with the proviso that the prepolymer comprises at least two free isocyanate groups, and (i), (ii), and (iii) amount to 100 wt % of the isocyanate component (A); and (B) a polyol component comprising at least one polyether polyol, at least one polyester polyol, or a combination thereof.

2. The laminate product of claim 1, wherein the isocyanate component (A) consists of (i) one or more diisocyanates, (ii) from 60 wt % to 70 wt % of a first polyethylene glycol having a molecular weight from 200 to 2,000 g/mol, and (iii) a second polyethylene glycol having a weight average molecular weight (Mw) of 200-2000 g/mol.

3. The laminate product of claim 1, wherein the isocyanate component (A) consists of (i) one or more diisocyanates, (ii) from 60 wt % to 70 wt % of a polyethylene glycol having a molecular weight from 200 to 2,000 g/mol, and (iii) a polypropylene glycol.

4. The laminate product of claim 1, wherein the isocyanate component (A) consists of (i) one or more diisocyanates, (ii) from 60 wt % to 70 wt % of a polyethylene glycol having a molecular weight from 200 to 2,000 g/mol, and (iii) a polyester polyol.

5. The laminate product of claim 1, wherein (A) and (B) amount to 100 wt % of the adhesive layer.

\* \* \* \* \*